United States Patent [19]
Dziedzic

[11] Patent Number: 6,166,895
[45] Date of Patent: Dec. 26, 2000

[54] PATCH CABLE AND METHOD FOR INSTALLING TELECOMMUNICATIONS EQUIPMENT IN REMOTE TERMINALS

[75] Inventor: Lewis L. Dziedzic, Douglasville, Ga.

[73] Assignee: BellSouth Intellectual Property Corporation, Wilmington, Del.

[21] Appl. No.: 09/309,706

[22] Filed: May 13, 1999

[51] Int. Cl.[7] .................................................. H02H 1/00

[52] U.S. Cl. ............................................ 361/119; 361/117

[58] Field of Search ..................................... 361/118, 119, 361/117

[56] References Cited

U.S. PATENT DOCUMENTS 6,008,976 12/1999 Pisterzi ..................................... 361/119

*Primary Examiner*—Josie Ballato
*Assistant Examiner*—Rios Roberto
*Attorney, Agent, or Firm*—Shaw Pittman

[57] ABSTRACT

A patch cord and method for installing new hardware in a remote terminal of a telecommunications system. Hardware installed inside remote terminal cabinets require lightning protection systems to prevent damage from sudden power surges. The patch cord and method allow new hardware to be installed in the remote terminal using existing lightning protection systems.

22 Claims, 8 Drawing Sheets

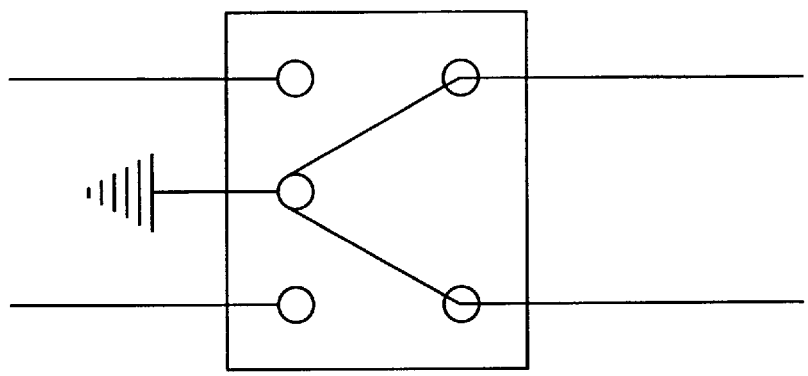
FIG. 2c *PRIOR ART*
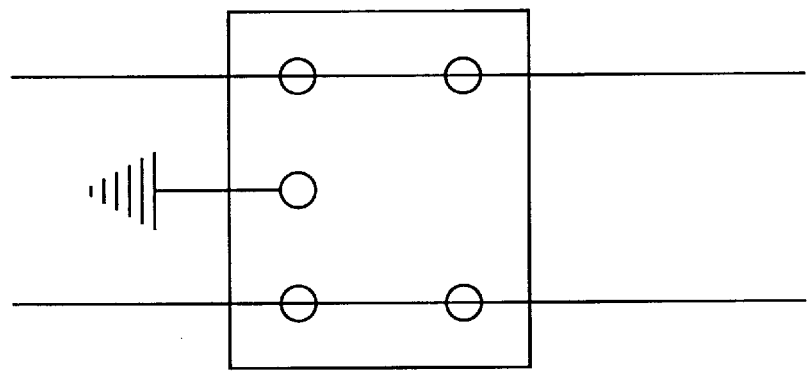
FIG. 2b *PRIOR ART*
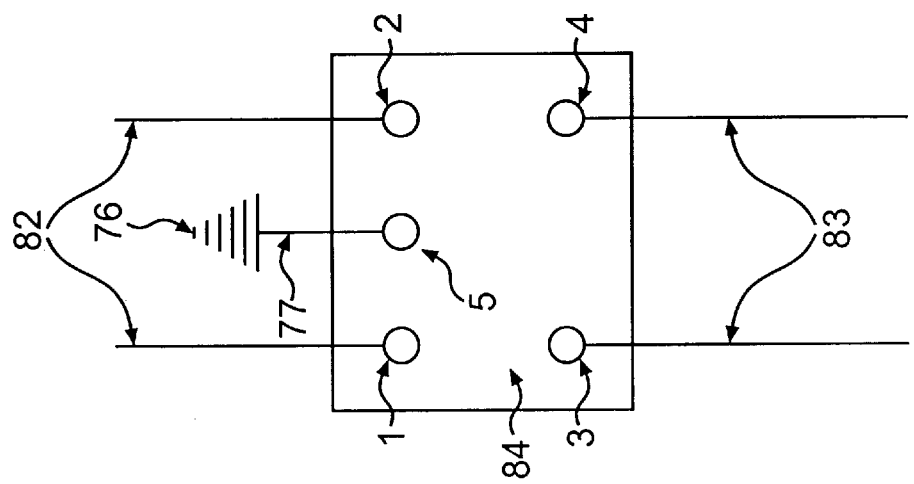
FIG. 2a *PRIOR ART*

PATCH CABLE AND METHOD FOR INSTALLING TELECOMMUNICATIONS EQUIPMENT IN REMOTE TERMINALS

FIELD OF THE INVENTION

The present invention relates generally to telecommunications systems, and more particularly, to a patch cable and method for installing new hardware in remote terminal cabinets.

BACKGROUND OF THE INVENTION

Wire-based analog telephone services (i.e., plain old telephone services, or POTS) are generally provided between the telephone company's central office (CO) and individual customers using twisted pairs of copper wire. Due to interference and signal loss, POTS transmission over copper wire is feasible only up to a maximum length of about 18,000 feet. For those customers situated within about 18,000 feet of the CO, the twisted pairs of copper wire may be directly connected between the customer's individual termination point (or outlet) and a service switching point (SSP) within the CO.

A digital loop carrier (DLC), housed in a remote terminal (RT) cabinet, is used to provide POTS to customers situated more than 18,000 feet from the CO. As shown in FIG. 1, in a DLC system a fiber optic cable 81 runs between the CO 79 and the DLC 80 which may be located well over twenty-five miles from the CO. Customers may be located up to about 12,000 feet from the RT and are connected to the DLC via twisted pair copper wires. As a safety measure, the copper wiring 83 from the customer is electrically connected to an individual protector socket 84 on the lightning protector block 75. The protector socket 84 is electrically connected to the DLC via splices in the wiring 82 between the socket and the DLC. A lightning protector, or fuse (not shown) is plugged into the individual protector socket 84 to complete the circuit between that customer's wires and the POTS from the DLC.

FIG. 2a is an enlarged schematic diagram of the electrical connections terminated on protector socket 84. Wires 82 from the DLC to protector block 75 individually terminate at prong holes 1 and 2 of a single protector socket 84. Similarly, wires 83, to the customer, individually terminate at prong holes 3 and 4 of the protector socket. A separate wire 77 terminates at ground 76 on one end and terminates at prong hole 5 of protector socket 84 at the other end.

The circuit between the FDI and the DLC is open (FIG. 2a) unless the protector 65 is plugged in (FIG. 2b). More specifically, there is no electrical connection between prong holes 1 and 3 and between prong holes 2 and 4 unless the protector is in place. FIG. 2b shows the electrical connections established on the protector block when the protector is plugged in. In the event of a power surge, as in the case of a lightning strike, the protector will open the circuits and divert the surge to ground as shown in FIG. 2c.

RT and DLC configurations are sometimes used even when the customers are within the 18,000 foot limit for transmission over copper wire. For example, fiber optic cables may be used to reduce the amount of wires running to and from the CO. Fiber optic cables may also be used to connect new customers in concentrated areas such as in new housing sub-divisions. This lowers the initial costs by reducing the amount of copper wiring and installation hours required. The result is that millions of telecommunications customers in the United States are currently served via RTs.

Due to the high demand for additional features and increased bandwidth requirements, POTS services are presently giving way to high-speed digital telecommunications services. To maximize returns on substantial investments in the current infrastructure, it is often desirable to utilize the existing copper wiring for deploying such new services. An example of one such new service is the Asymmetrical Digital Subscriber Line (ADSL) which provides customers with high speed connections to their Internet Service Providers (ISP) over the same twisted pair copper wiring that is used to provide POTS.

POTS from the SSP must be redirected to a multiplexer for combining the new signal (e.g., the ADSL signal) with POTS to output a single combined signal. This combined signal is then transmitted from the multiplexer to the customer's outlet over the existing copper wiring. If a customer is directly connected to the SSP, installing a new service involves moving the customer's line from the SSP to the multiplexer and connecting the multiplexer to the SSP.

The multiplexer will vary depending on the type of new service offered. For example, a Digital Subscriber Line Access Multiplexer (DSLAM) is commonly used with ADSL services. As described above, the DSLAM is positioned between the customer and the SSP. The DSLAM receives a data circuit (needed for ADSL) from the ISP and a dial tone (needed for POTS) from the SSP and combines the two signals. The DSLAM then outputs the combined dial tone and data over a single pair of copper wires to the customer's termination point. If the installation is made correctly, the interruption of POTS service is of short duration and is limited to the customer subscribing to the new service.

Providing new services (e.g., ADSL) for those customers connected to the CO via DLC requires inserting a multiplexer between the DLC and the customer. This additional multiplexing equipment must have lightning protection to prevent lightning damage. One way to do this would be to install additional lightning protectors in the RT. However, the preferred solution is to use the existing protectors because of the limited availability of space in the RT. FIG. 3 is a schematic showing the electrical connections required.

As shown in FIG. 3, prior to the present invention, the conventional procedure for installing new equipment in the RT required multiple steps: (1) unwrapping the splices joining wires from the protector block to the DLC, (2) pulling apart the wires for the specific customer to be provided the service, (3) adding splices 100 joining the wires between the multiplexer 90 and the DLC, and (4) adding splices 110 joining the multiplexer and the protector block. There are several disadvantages to this installation process.

First, because the existing splice must be opened and pulled apart, other customers' services will be interrupted if their wire pairs are inadvertently pulled apart. Such undesirable interruptions were commonplace when the conventional procedure described above was used. Second, the process requires skilled labor and is time-consuming. For example, even with highly skilled technicians, providing ADSL service to one DLC customer could take up to a half day. Moreover, the manual splicing procedures must be repeated every time a new customer requests ADSL service.

A third disadvantage of the manual splicing method is that once a piece of equipment is manually spliced into the RT, it becomes a relatively permanent fixture and cannot be easily removed or relocated to another RT. This disadvantage may be limited in the case where there are many subscribers to the ADSL service within a single RT. In such case, an RT solution DSLAM (serving up to 192.customers) may be permanently installed. However, as is often the case, many customers will delay subscription to new services when first introduced. Thus, initially only a small percentage of total users will need to be connected. It is more economical to use smaller devices such as a Remote Access Multiplexer (Mini-RAM) which serves, e.g., only 8 customers. As the number of customers subscribing to the new service increases over time, additional Mini-RAMs could be spliced in, but due to limited space in the RT, a more likely solution would be to replace the Mini-RAM with an RT solution DSLAM to accommodate all of the DLC's customers. Removing Mini-RAMs that have been spliced in using prior art methods is costly and time-consuming. It requires the multiple steps of opening splices, removing the equipment and re-splicing wires.

It is an object of the present invention to provide a patch cord and method for installing new equipment, such as a DSLAM or Mini-RAM, into an RT without the need for manually splicing the connections.

It is another object of the present invention is to allow technicians to rapidly install ADSL service for a DLC customer. It is a further object of the present invention to provide a reusable cable for connecting and disconnecting equipment within an RT.

SUMMARY OF THE INVENTION

The present invention is a patch cord for use in connecting equipment between the Digital Loop Carrier (DLC) and the lightning protector within a Remote Terminal (RT) without the need to manually splice the connecting wires. The patch cord makes use of the existing standard lightning protector blocks and fuses and obviates the need to manually splice the wires as was required in the prior art.

FIGS. 4a–4d (described in more detail below) show an embodiment of a patch cord providing electrical connection for up to four customer lines. As shown in FIG. 4b, the composite end of the patch cord has a standard connector fitting the new equipment's input/output port. Each line requires two input wires (i.e., from the DLC) and two output wires (i.e., to the FDI). Preferably, the composite end of the patch cord has sixteen wires divided into four sets of four wires each. As shown in FIG. 4b, each set of four wires has its own protector cradle and each protector cradle has its own protector as described below. Wires from the protector cradles electrically connect to protector plugs which fit into the protector socket on the protector block. Each protector plug has five prongs arranged in a mirror-image pattern of the prong holes for an individual protector socket. Two of the prongs provide electrical connectivity to the wires from the DLC, two different prongs connect the wires from the FDI, and the fifth prong connects to ground.

As shown in FIG. 5, two input wires (for each customer line) are connected between the connector and the protector plug, electrically terminating at individual prongs on the plug. These prongs are configured so that they can be inserted into the prong holes on the protector socket corresponding to a single customer line coming from the DLC. Two output wires are connected to the protector cradle, electrically terminating at individual inbound prong holes on the cradle. Two of the three outbound prong holes on the protector cradle are electrically connected to two individual prongs on the protector plug via wires as shown in FIG. 5. These prongs are configured so that they can be inserted into the prong holes on the protector socket corresponding a line coming from a single customer.

A single wire electrically connects the third outbound prong hole on the protector cradle to the remaining prong on the protector plug. This prong is configured so that it can be inserted into the prong hole on protector socket that is electrically connected to ground. When the protector is plugged in to the protector cradle, it functions as if it were plugged into the protector socket. That is, there is no electrical connection between any of the prong holes on the protector cradle unless the protector is in place as shown in FIG. 6a. FIG. 6b shows the electrical connections established on the protector cradle when the protector is plugged in. In the event of a surge of power, as in the case of a lightning strike, the protector will open the circuits and divert the surge to ground as shown in FIG. 6c.

The present invention also provides a new method for installing additional equipment in the RT. In the new method, the existing protector is unplugged from the protector socket and plugged into the protector cradle of a patch cord. Next, the protector plug of the patch cord is plugged into the protector socket in the place from which the protector was removed. Finally, the composite end of the patch cord is attached to the new equipment.

DESCRIPTION OF THE DRAWINGS

FIG. 2a is a schematic diagram of the electrical connections on a single protector socket without a plugged in.

FIG. 2b is a schematic diagram of the electrical connections on a single protector socket with a plugged in.

FIG. 2c is a schematic diagram of the electrical connections on a single protector socket with a plugged in immediately after a sudden power surge.

FIG. 6a is a schematic diagram of the electrical connections on a single protector cradle without a plugged in.

FIG. 6b is a schematic diagram of the electrical connections on a single protector cradle with a plugged in.

DETAILED DESCRIPTION OF THE INVENTION

The present invention is a patch cord and method for installing new equipment within a Remote Terminal (RT)

cabinet of a typical POTS telephone installation. The patch cord allows installation of new equipment between the lightning protector block and the Digital Loop Carrier (DLC) without manually splicing the connections.

Figure 1:
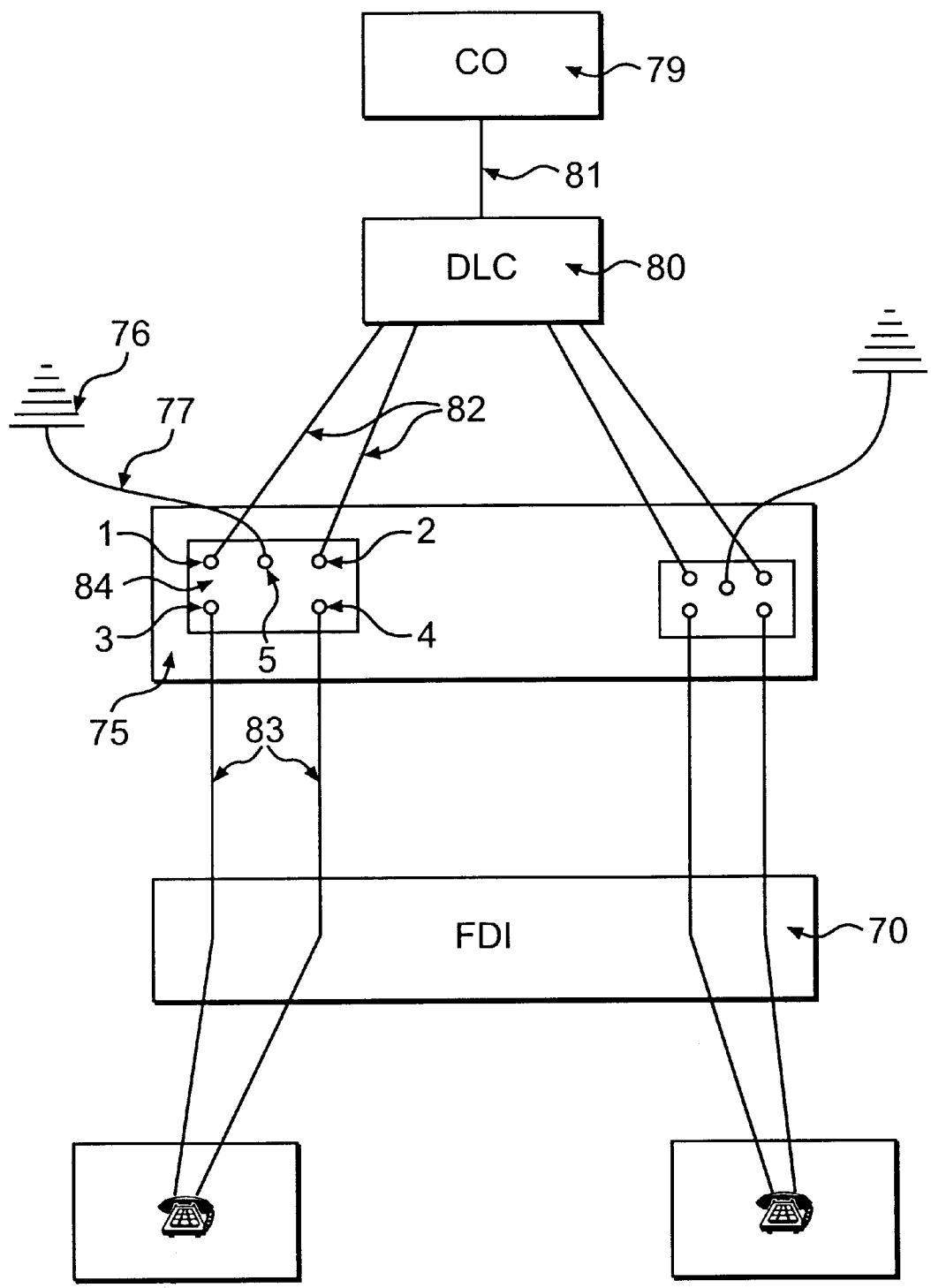
FIG. 1 is a schematic diagram of the connections made between a DLC, a protector plug and an FDI for POTS-only service.
Figure 3:
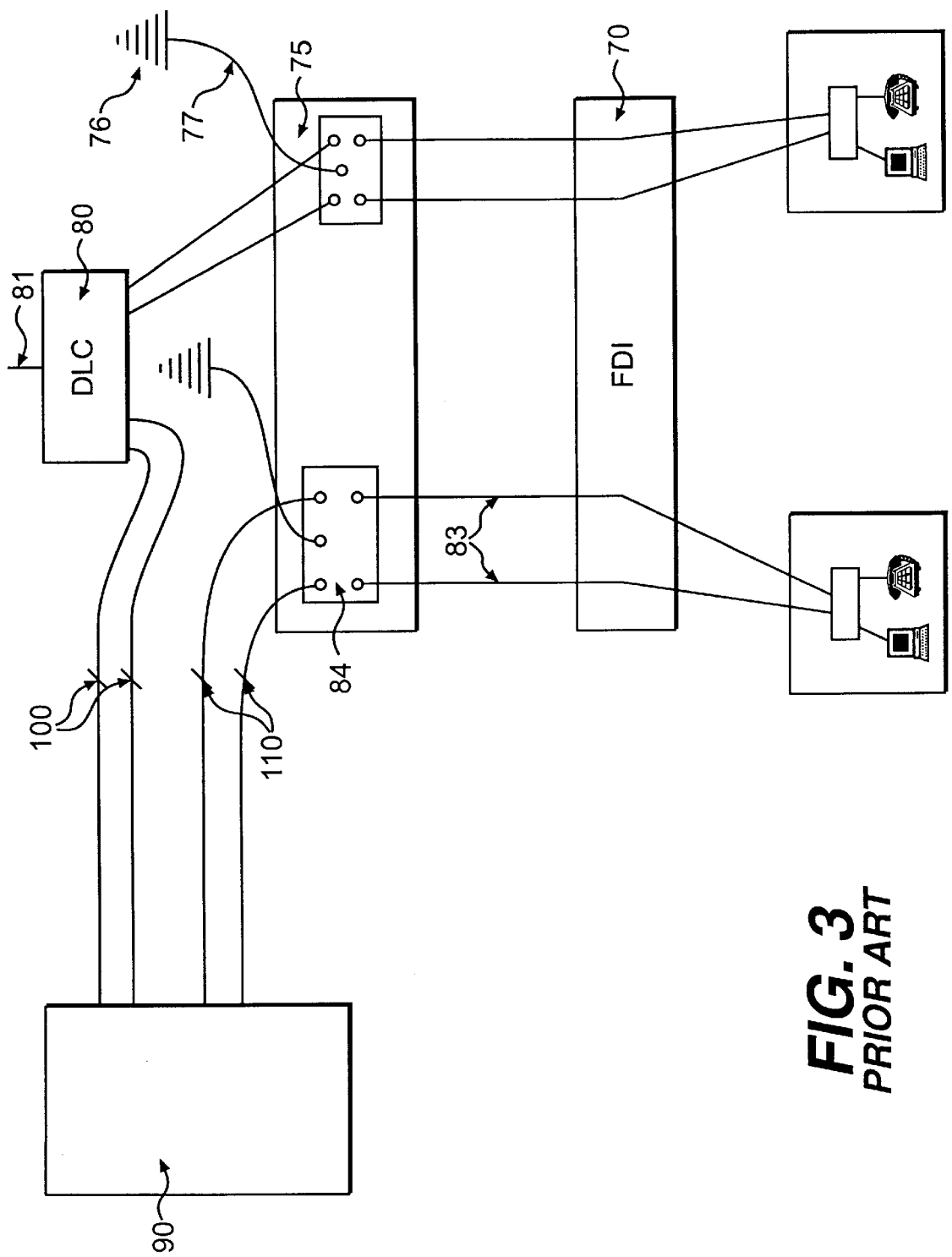
FIG. 3 is a schematic diagram of the prior art electrical connections made between a DLC, a DSLAM (or Mini-RAM), a protector plug and an FDI for combined ADSL and POTS service.
Figure 4A:
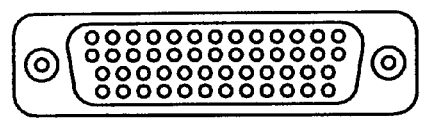
FIG. 4a is a schematic diagram of an end view of a connector used in an embodiment of the present invention.
Figure 4C:
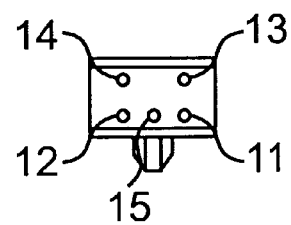
FIG. 4c is a schematic diagram of an end view of a protector cradle showing the configuration of the prong holes in an embodiment of the present invention.
Figure 4D:
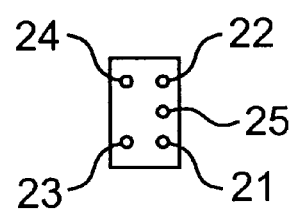
FIG. 4d is a schematic diagram of an end view of a protector plug showing the configuration of the prongs in an embodiment of the present invention.
Figure 4B:
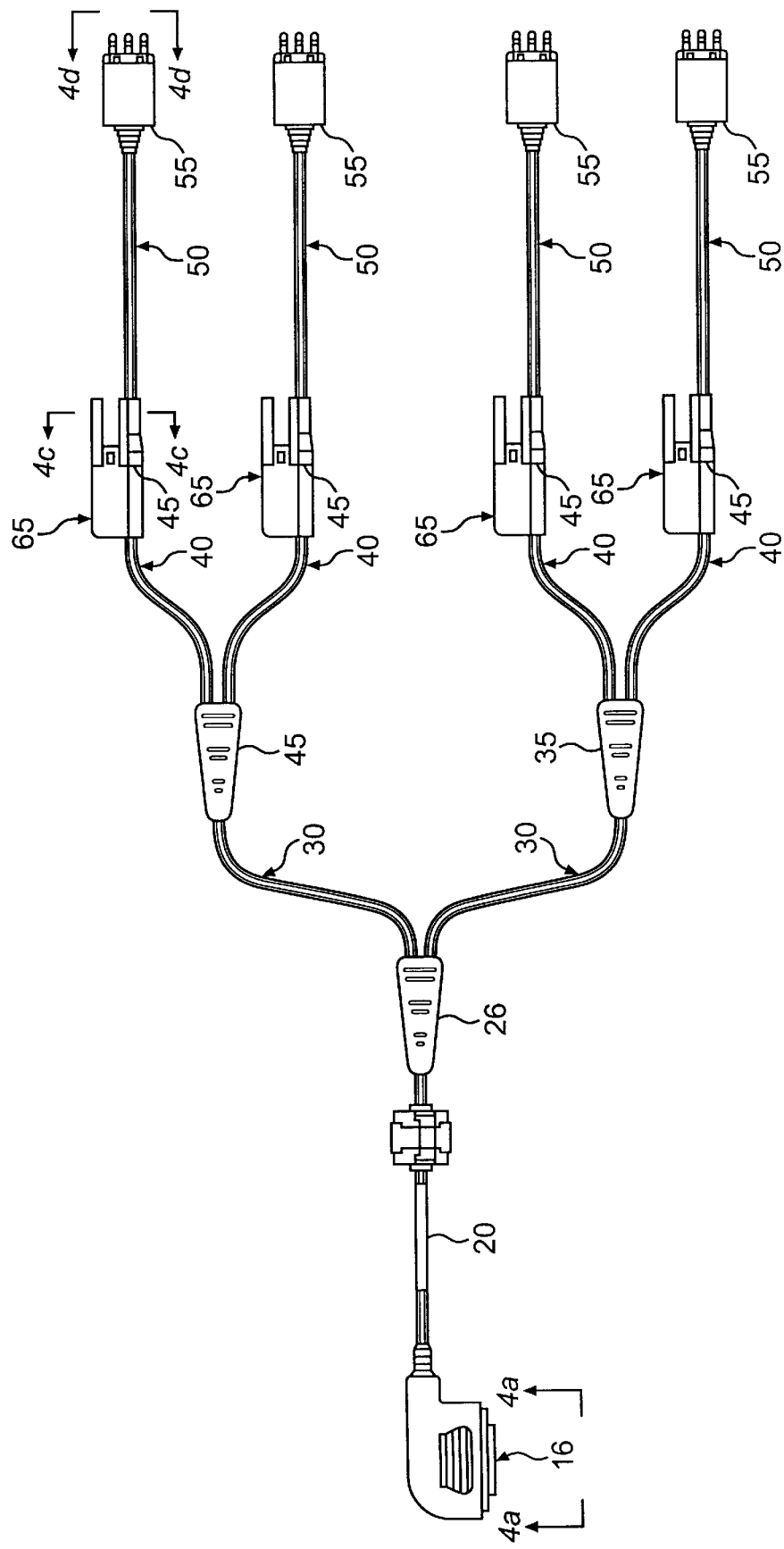
FIG. 4b is a schematic diagram of a patch cord of the present invention connecting four lines from a DLC to a new piece of equipment.

FIGS. 4a–4d show an implementation of the present invention for multiplexing four lines. As shown in FIG. 4b, the patch cord has a composite end 10 with a connector 16 adapted to fit input/output ports on the new equipment. An end view of connector 16 is shown in FIG. 4a. In this embodiment, sixteen wires 20 lead from composite end 10 to an upper "Y" junction 26 which divides the sixteen wires into two sets 30 of eight wires each. The two sets of eight wires each lead into separate lower "Y" junctions 35 which further divide the sets into a total of four sets 40 of four wires each. Each set of four wires leads into individual protector cradles 45. Each protector cradle has five wires 50 connecting it to end plug 55. The lightning protector 65 for each line to be redirected is removed from the individual protector socket and inserted into the individual protector cradle. Each end plug is configured to fit into the individual protector sockets 84 in place of the removed protector fuse. The equipment is thus grounded to prevent damage from lightning strikes.

The protector cradles 45 have five prong holes configured so that the five-prong protector 65 can plug into it. The protector cradles may be oriented upwardly or downwardly. In a preferred embodiment the cradles are oriented such that the end of the protector points downwardly, toward the end plug 55 of the cable as shown in FIG. 4b.

Figure 7:
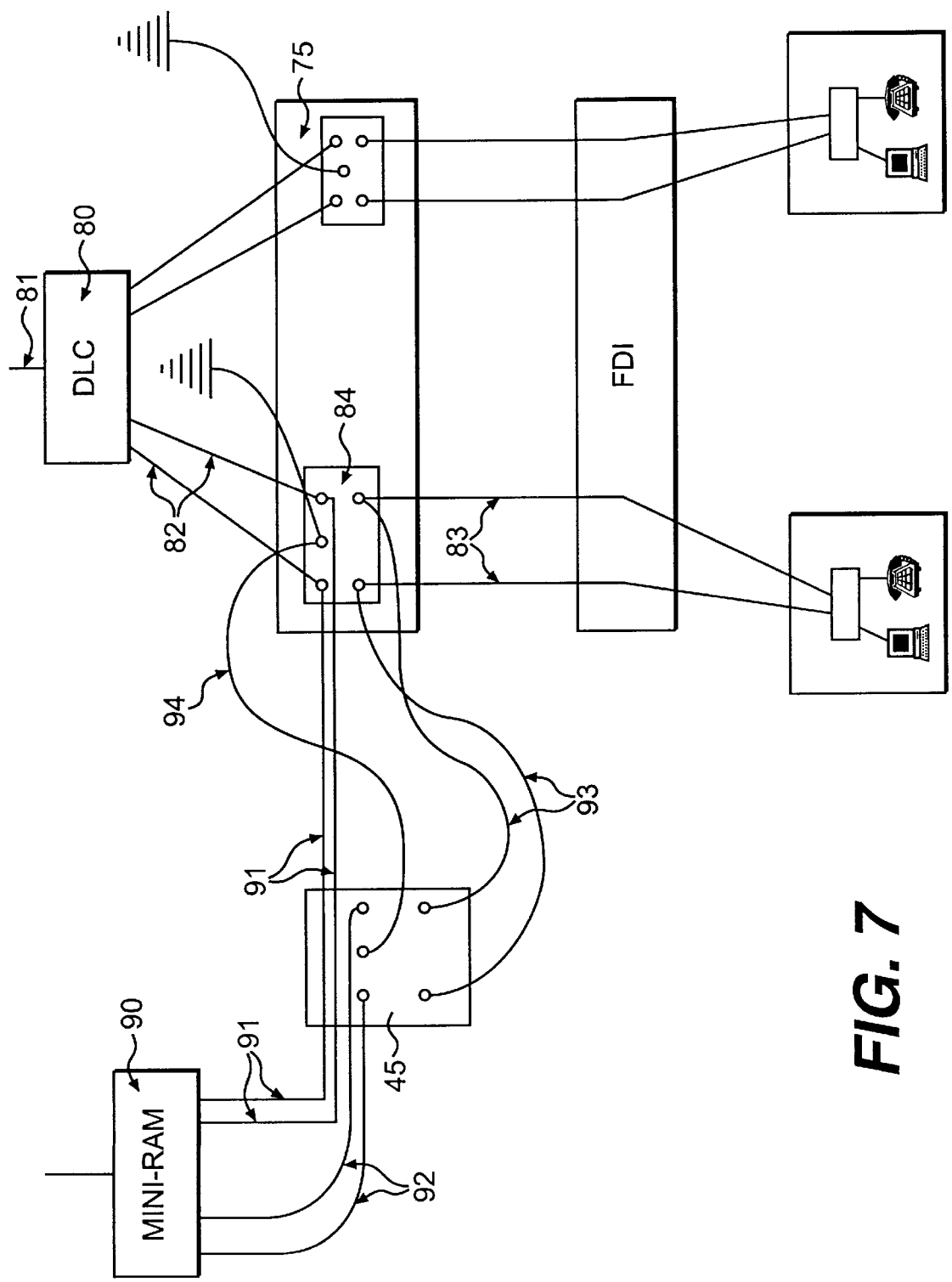
FIG. 7 is a schematic diagram showing the electrical connections made between the DLC, the DSLAM (or Mini-RAM), the protector plug and the FDI for ADSL and POTS service according to the present invention.

The present invention uses the existing configuration and hardware of protector socket 84 and protector 65. For simplicity, the following descriptions of the electrical connections required under the present invention are limited to a single customer line. Those skilled in the art are readily capable of extending the descriptions provided herein to manufacture a patch cord for multiple lines. FIG. 7 is a schematic diagram of the electrical connections established when installing new equipment, such as a Mini-RAM, according to this invention.

Figure 5:
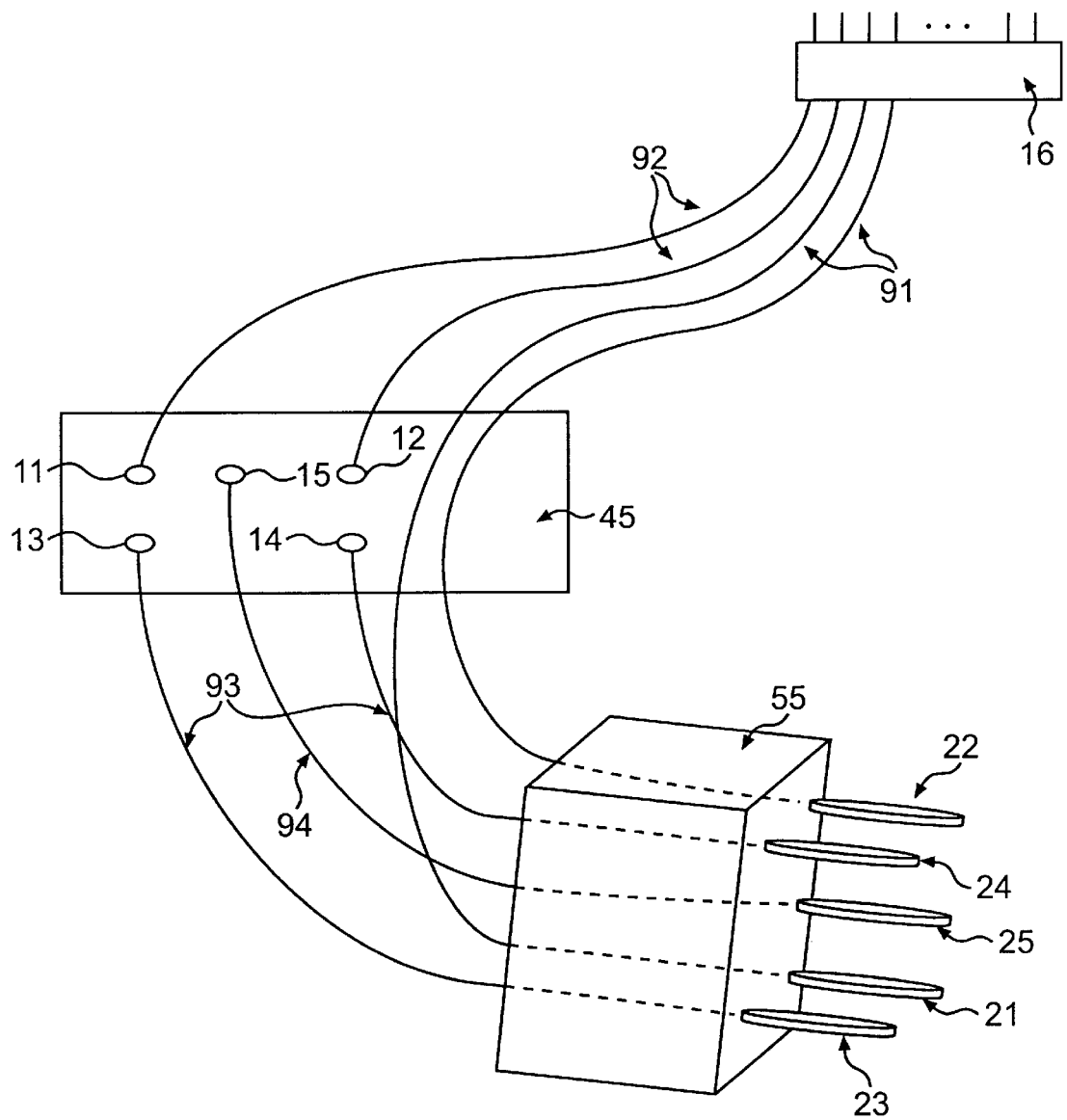
FIG. 5 is a schematic diagram showing the electrical connections in an embodiment of the present invention.
Figure 6C:
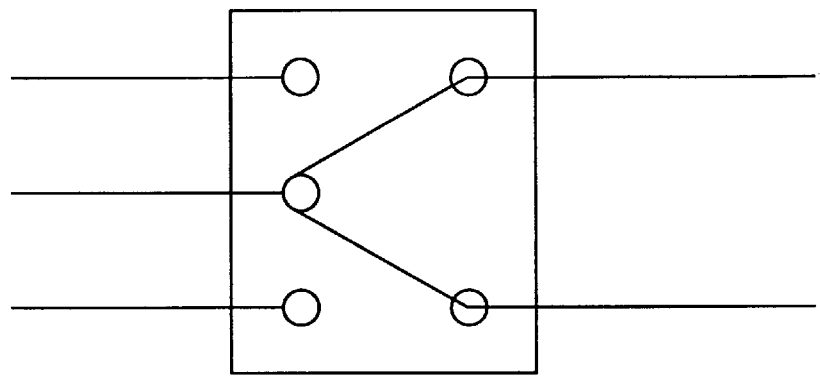
FIG. 6c is a schematic diagram of the electrical connections on a single protector cradle with a plugged in, immediately after a sudden power surge.
Figure 6B:
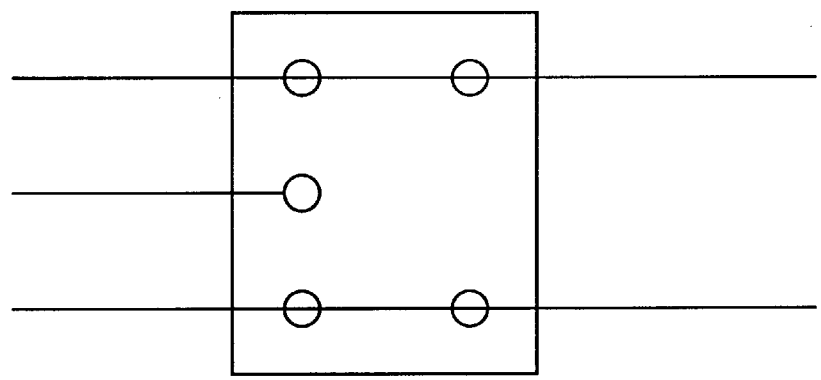
Figure 6A:
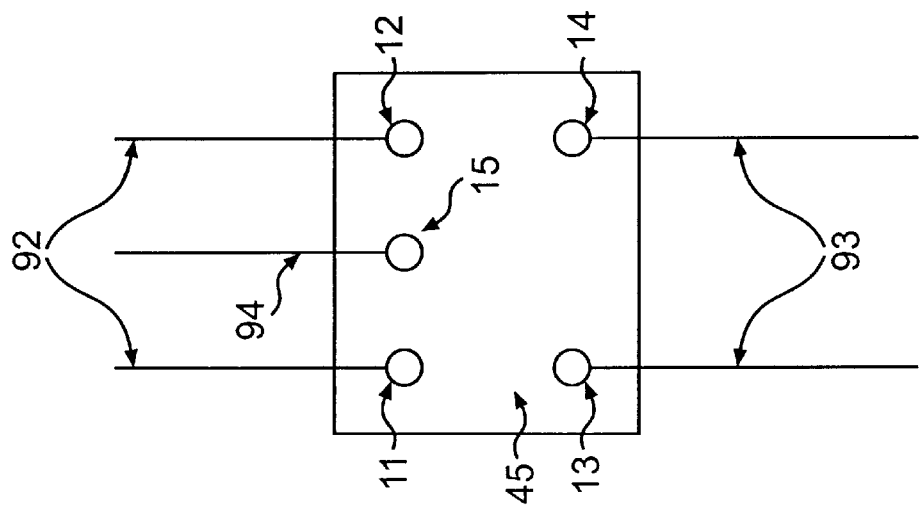

The electrical connections between the DLC and the new equipment do not require lightning protection. Thus, the present invention leaves intact the existing electrical connection between the DLC and the protector socket 84 (i.e., the wires 82 from the DLC remain directly connected to prong holes 1 and 2 of protector socket 84). Instead, the present invention provides a patch cord that plugs into the protector socket 84 such that prongs 21 and 22 on the end plug 55 of the patch cord, as shown in FIG. 5, plug into prong holes 1 and 2, respectively. Individual wires 91, electrically connected to prongs 21 and 22, pass straight through to new equipment (via connector 16) without lightning protection.

Prongs 23 and 24 of plug 55 plug into prong holes 3 and 4, respectively, of protector socket 84. Individual wires 93, electrically connected to prongs 23 and 24, are electrically connected to prong holes 13 and 14, respectively, of the protector cradle 45. Similarly, individual wires 92, electrically connected to prong holes 13 and 14, are electrically connected to the new equipment (via connector 16), as shown in FIG. 5.

Prong 25 of end plug 55 plugs into prong hole 5 on protector socket 84, which is electrically connected to ground as shown in FIG. 7. Wire 94 is electrically connected at one end to prong 25 of plug 55 and electrically connected at the other end to prong hole 15 of the protector cradle 45. When protector 65 is plugged into the cradle, it will function exactly as previously described. Under normal conditions (i.e., in the absence of power surges), the protector closes the circuit between prong holes 11 and 13 and between prong holes 12 and 14 of the protector cradle allowing the combined POTS and data signals to pass between the Mini-RAM and the FDI. However, in the event of a sudden power surge, e.g., a lightning strike, the through circuits are opened and the power is diverted to ground.

The process for installing additional equipment in the RT of the current invention is now very simple. One only needs to identify the existing protector for the customer whose service is to be upgraded. Then, the is unplugged from the protector block and plugged into the protector cradle of the patch cord. Next, end plug 55 is plugged into the protector block in the location corresponding to the customer (i.e., the place from which the protector was removed). Preferably, the end plug selected will be colored coded for easy identification of the particular customer's line (as described below). The final step is to plug the composite end of the patch cord into the Mini-RAM device.

As should be apparent to those skilled in the art, providing new services to existing DLC customers using the process and apparatus of the present invention overcomes all of the cited inadequacies of the prior art. No additional splicing is required, leaving the wires from the DLC 80 to the protector block 75 intact. The wires from the protector block 75 to the FDI 70 are also left intact. The entire process can be performed in a matter of minutes with only a minimal possibility of unintentional interruptions to other customers.

A further advantage of the present invention is that it uses the existing protector fuse. Thus technicians may continue using known procedures for troubleshooting operations wherein test equipment is plugged into the end of the fuse.

One skilled in the art will recognize that the application of the current invention is not limited to DSLAM and Mini-RAM equipment. The descriptions of the embodiments described herein could be readily adapted for use with other equipment requiring connection between the DLC and lightning protector.

Other Embodiments

Although the implementation of the invention described in detail above provides for four simultaneous connections with one patch cord, the present invention could be used to provide more, or less connections, if desirable. One skilled in the art will readily be able to apply the principles of this invention to make and use patch cords of different capacity as required. In the preferred embodiment, four connections are provided because typical Mini-RAM equipment provides four users through one line termination card ("LT"), and four through another. Two of the patch cords described above could be used with one Mini-RAM.

In one embodiment of this invention, the composite end 10 is a standard twenty-five pin male connector (e.g., DB25) displacing the composite cable ends by 90 degrees to the cable pins, as shown in FIGS. 4a and 4b. In this example, the connector is less than about 1.5 inches, measured from the pins to the top of the connector. Using such a small profile ensures sufficient room for the RT cabinet door to shut without impacting the cable. Additionally, the connector preferably has sliding latches to firmly lock the connector into place on the equipment.

Preferably, each set of four wires is color-coded so that it is easy to identify the wires for each individual customer. For example, the wires for line #1 are colored blue, those for line #2 are colored orange, line #3 wires are green, and line #4 wires are brown. This coloring scheme corresponds to a standard coloring convention used by telephone service providers.

The length of each segment of wiring may vary depending upon the particular configuration within the RT. Factors to consider, for example, include the distance from the DLC to the Mini-RAM, and the amount of room in the RT cabinet. For example, in a typical installation, the length of segment 20, between the composite end 10 and the upper "Y" junction 26, is about 10 inches. Segments 30, between the upper and lower "Y" junctions 35, are about 4 inches in length. Segments 40, between the lower "Y" junctions and the protector cradles, are about 12 inches in length. Segments 50, between the protector cradles and plugs are about 42 inches.

In yet another embodiment of this invention, the cord may be constructed without the use of the upper and lower "Y" junctions. In this case, the sixteen wires from the composite end are separated into four sets of four wires each, with a length of up to about 28 inches. These sets of wires lead into the protector cradle as described above. In this embodiment, the "Y" junctions are used, as previously disclosed, to reduce tensile stress on the wires as they are separated.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A patch cable for connecting telecommunications equipment, comprising:
   (a) a first plurality of wires, each wire having a first end and a second end;
   (b) a second plurality of wires, each wire having a first end and a second end;
   (c) a third plurality of wires, each wire having a first end and a second end;
   (d) a plurality of connectors, having a plurality of connector pins, connected to the first end of each wire of the first plurality of wires and to the first end of each wire of the second plurality of wires;
   (e) a plurality of protector plugs, having a first plurality of prongs, connected to the second end of each wire of the first plurality of wires and to the second end of each wire of the third plurality of wire;
   (f) a plurality of protector cradles, having a plurality of prong holes, connected to the second end of each wire of the second plurality of wires and to the first end of each wire of the third plurality of wires; and
   (g) a plurality of protector fuses, having a second plurality of prongs, connected to the plurality of protector cradles, such that the second plurality of prongs electrically connects at least one wire from the second plurality of wires to at least one wire from the third plurality of wires.

2. The patch cable of claim 1, wherein:
   (a) the first plurality of wires comprises at least eight wires;
   (b) the second plurality of wires comprises at least eight wires;
   (c) the third plurality of wires comprises at least twelve wires;
   (d) the plurality of protector cradles comprises at least four protector cradles;
   (e) the plurality of protector fuses comprises at least four protector fuses; and
   (f) the plurality of protector plugs comprises at least four protector plugs.

3. The patch cable of claim 1, wherein:
   (a) the first plurality of prongs comprises at least five prongs arranged in a first pattern;
   (b) the second plurality of prongs comprises at least five prongs arranged in the first pattern;
   (c) the plurality of prong holes comprises at least five prong holes arranged in a second pattern such that the second pattern is a mirror image of the first pattern; and
   (d) the plurality of connector pins comprises at least sixteen connector pins.

4. The patch cable of claim 1, wherein:
   (a) the first ends of each wire of the first and second pluralities of wires are electrically connected to individual connector pins of the plurality of connector pins, such that each connector pin is connected to one wire;
   (b) the second ends of each wire of the first and third pluralities of wires are electrically connected to individual prongs of the first plurality of prongs, such that each prong is connected to one wire; and
   (c) the second ends of each wire of the second plurality of wires and the first ends of each wire of the third plurality of wires are electrically connected to individual prong holes of the plurality of prong holes, such that each prong hole is connected to one wire.

5. The patch cable of claim 1 wherein the first and third pluralities of wires are color-coded such that the wires connected to the plurality of protector plugs are of different color for each of the plurality of protector plugs.

6. The patch cable of claim 1 further comprising a plurality of "Y" junctions connected to the first, second and third pluralities of wires.

7. A patch cable for connecting telecommunications equipment comprising:
   (a) two first wires, each having a first end and a second end;
   (b) a connector, comprising four individual pins, wherein two of the four individual pins are electrically connected to the first ends of the two first wires;
   (c) two second wires, each having a first end and a second end, connected to the connector such that the first ends are electrically connected to two of the four individual pins of the connector, such that each of the four individual pins has at most one wire connected thereto;
   (d) a protector cradle, comprising five prong holes, electrically connected to the second ends of the two second wires, such that each prong hole has at most one wire connected thereto;
   (e) three third wires, each having a first end and a second end, connected to the protector cradle, such that each first end is electrically connected to one of the five prong holes;
   (f) a protector fuse, having five protector prongs, wherein the protector prongs are electrically connected to the prong holes on the protector cradle; and
   (g) a protector plug, having five plug prongs, connected to the second ends of the two first wires and the second ends of the three second wires, such that each prong is electrically connected to one wire.

8. The patch cable of claim 7, wherein the protector electrically connects the two second wires to two of the three third wires.

9. A patch cable for connecting telecommunications equipment comprising:
  (a) a first plurality of wires, equally divided into a first half of wires and a second half of wires, wherein each of the first plurality of wires has a first end and a second end;
  (b) a connector connected to the first end of each of the first plurality of wires;
  (c) a second plurality of protector cradles, wherein the first plurality is four times the second plurality, electrically connected to the second end of the first half of wires;
  (d) a third plurality of wires, wherein the third plurality is three times the second plurality, having a first end and a second end, wherein the first end is electrically connected to the second plurality of protector cradles;
  (e) a fourth plurality of protector fuses, wherein the fourth plurality is equal to the second plurality, electrically connected to the second plurality of protector cradles; and
  (f) a fifth plurality of protector plugs, wherein the fifth plurality is equal to the second plurality, electrically connected to the second end of the second half of wires and to the second end of the third plurality of wires.

10. The patch cable of claim 9, further comprising a first "Y" junction connected to the first plurality wires dividing the first plurality of wires into a first set of wires and a second set of wires.

11. The patch cable of claim 10, wherein:
  (a) the first set of wires comprises half of the first half of wires, and half of the second half of wires, and
  (b) the second set of wires comprises half of the first half of wires, and half of the second half of wires.

12. The patch cable of claim 10 further comprising a second and a third "Y" junction connected to the first plurality of wires such that:
  (a) the second "Y" junction divides the first set of wires into a third set of wires and fourth set of wires, and
  (b) the third "Y" junction divides the second set of wires into a fifth set of wires and a sixth set of wires.

13. The patch cable of claim 12 wherein:
  (a) the third set of wires comprises one quarter of the first half of wires, and one quarter of the second half of wires;
  (b) the fourth set of wires comprises one quarter of the first half of wires, and one quarter of the second half of wires;
  (c) the fifth set of wires comprises one quarter of the first half of wires, and one quarter of the second half of wires; and
  (d) the sixth set of wires comprises one quarter of the first half of wires, and one quarter of the second half of wires.

14. The patch cable of claim 12 wherein the protector cradles of the second plurality of protector cradles are electrically connected to one of the third, fourth, fifth or sixth sets of wires.

15. The patch cable of claim 12 wherein the protector plugs of the fifth plurality of protector plugs are connected to one of the third, fourth, fifth or sixth sets of wires.

16. A patch cable for connecting telecommunications equipment comprising:
  (a) at least four first wires having a first end and a second end, wherein:
    (i) at least two of the at least four first wires have a first length, and
    (ii) at least two of the at least four first wires have a second length, such that the second length is longer than the first length;
  (b) a connector having at least four connector pins, wherein:
    (i) at least two pins of the at least four connector pins are electrically connected to the first end of at least two of the first wires having the first length,
    (ii) at least two pins of the at least four connector pins are electrically connected to the first end of at least two of the first wires having the second length;
  (c) at least one protector cradle, connected to the second end of at least two first wires having a first length;
  (d) at least three second wires, having a first end and a second end, wherein the first end is connected to the at least one protector cradle;
  (e) at least one protector connected to the at least one protector cradle; and
  (f) at least one protector plug connected to the second ends of the least three of the at least three second wires and the at least two first wires having a second length.

17. The patch cradle of claim 16, wherein the second length is at least two times the first length.

18. The patch cradle of claim 16, wherein the at least three second wires have a third length such that the first length plus the second length is about equal to the second length.

19. A method of connecting a customer line to new equipment in a telecommunications remote terminal cabinet comprising:
  (a) identifying a protector block;
  (b) on the protector block, identifying a protector and a protector socket corresponding to the customer line to be connected;
  (c) removing the protector from the protector socket on the protector block;
  (d) providing a patch cable having a connector and at least one free protector plug;
  (e) plugging in the at least one free protector plug into the protector socket on the protector block; and
  (f) connecting the connector to the new equipment.

20. The method of claim 19, wherein the patch cable has at least one free protector cradle, further comprising the step of plugging the protector into the at least one free protector cradle.

21. A method of connecting new equipment in a telecommunications remote terminal cabinet comprising:
  (a) identifying a protector block;
  (b) on the protector block, identifying a protector and a protector socket for a line to be connected to the new equipment;
  (c) removing a protector from the protector socket on the protector block;
  (d) providing a patch cable comprising:
    (i) at least four first wires each having a first end and a second end,
    (ii) a connector connected to the first end of the at least four first wires,
    (iii) at least one free protector cradle, connected to the second end of at least two of the at least four first wires, (iv) at least three second wires, each having a first end and a second end, wherein the first end of each the at least three second wires is connected to the protector cradle, (v) at least one protector plug connected to the second end of at least two of the at least four first wires and connected to the second end of the at least three second wires;

(e) installing the protector into the at least one free protector cradle on the patch cable;

(f) identifying the protector plug electrically connected to the protector cradle in which the protector was installed;

(g) plugging the protector plug into the protector socket; and (h) connecting the connector to the new equipment.

22. The method of claim 21 wherein the connector of the patch cable is a 25-pin male connector.

* * * * *